Patented Dec. 10, 1946

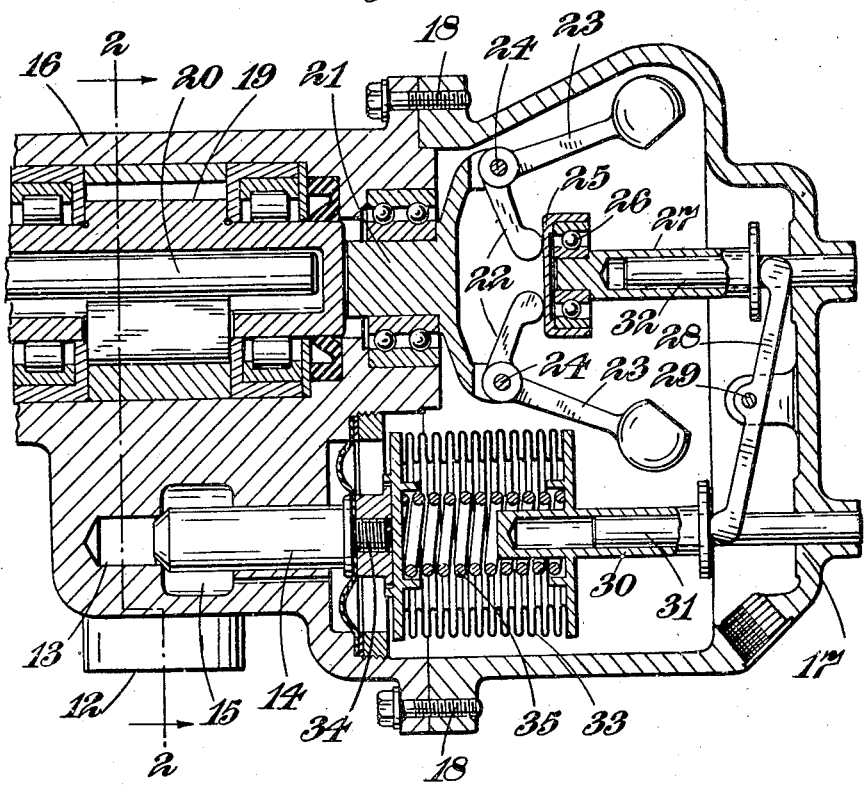

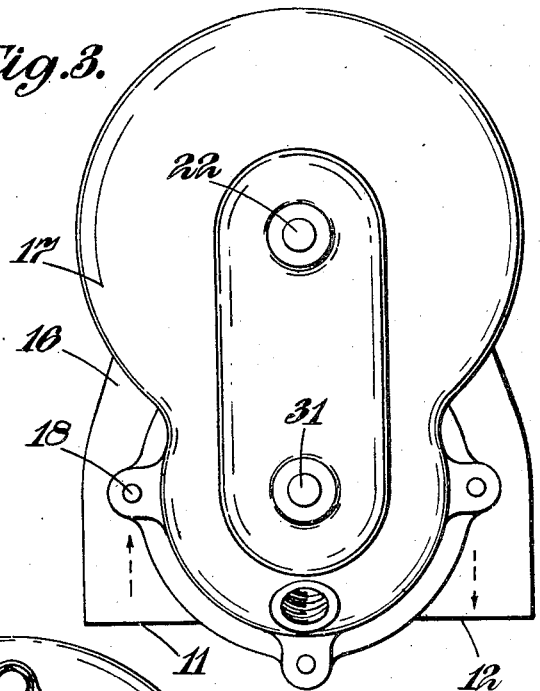
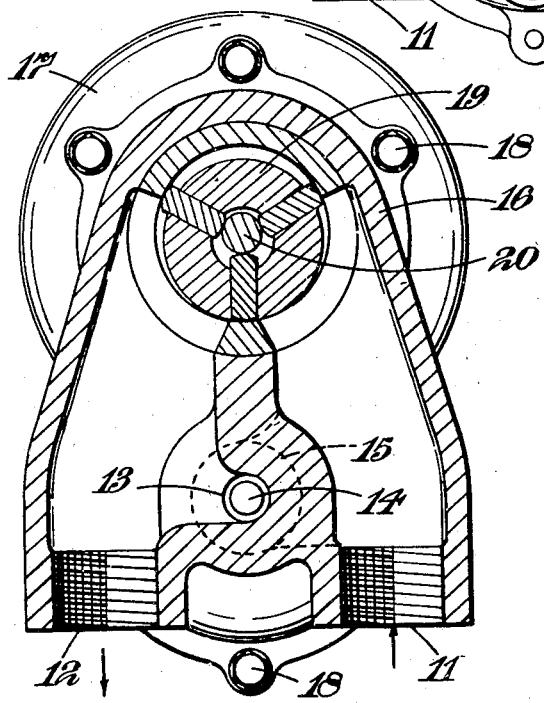

2,412,289

UNITED STATES PATENT OFFICE 2,412,289

PUMP HAVING BYPASS WITH SPEED-SENSITIVE AND PRESSURE-RESPONSIVE CONTROL

Cyril Alphonso Pugh and Douglas Gerhard Booth, Ilford, England, assignors to The Plessey Company Limited, Ilford, Essex, England, a British company Application May 16, 1942, Serial No. 443,186
In Great Britain April 7, 1941

2 Claims. (Cl. 103—12)

This application corresponds to the application of Cyril Alphonso Pugh, Douglas Gerhard Booth, and The Plessey Company Limited, Serial No. 4,635/41, which was filed in Great Britain on April 7, 1941, and which was issued as British Patent No. 549,205, complete specification accepted Nov. 11, 1942.

This invention consists in improvements in or relating to fluid supply and control systems for use in aircraft and is especially applicable to systems for supplying liquid fuel under pressure to an aircraft engine or other fuel-consuming means.

One object of the invention is to provide a supply of fluid at a pressure which varies both with the speed of the engine or rate at which the fluid is consumed and also with atmospheric pressure.

According to the present invention a fluid-supply and control system comprises in combination a pump driven by an engine or other fuel consuming means, which pump delivers fluid at excess flow and has a by-pass between the inlet and outlet, valve means controlling this by-pass, a speed-sensitive device driven in company with the pump, and pressure responsive means which varies automatically in effective length and constitutes an operative connection between the speed-sensitive device and the by-pass valve-means to vary the effective length of that operative connection, whereby the force with which the speed-sensitive device acts upon the valve is varied by changes in pressure to which the pressure-responsive means is subjected.

For a given range of speed and a given range of atmospheric pressure, the mechanism serving to actuate the valve or valves controlling the by-pass is arranged to operate according to a predetermined relationship on the one hand between the delivery pressure of the pump and the speed, and on the other hand between the delivery pressure and the atmospheric pressure.

Other features of the invention consist in the provision of means which may be adjustable for limiting the travel of the governor device to maintain a predetermined pressure, and also in providing means to correct the pressure according to variations in temperature, for instance atmospheric temperature.

In order that the invention may be more clearly understood, a preferred example will now be described with the aid of the accompanying drawings, in which—

Figure 1 is a central section through those parts of the apparatus essential to the present invention;

Figure 2 is a section on the line 2—2 of Figure 1;

Figure 3 is an end view looking from the right of Figure 1, and

Figure 4 diagrammatically represents the position of the valve in relation to the main and by-pass conduits.

As diagrammatically illustrated in Figure 4, the pump is represented at 10 as having an inlet 11 and an outlet 12. A port 13 directs pressure fluid from the pump outlet towards one face of a valve 14 which controls a branch passage 15 connecting the inlet with the outlet of the pump as a by-pass return to the pump itself.

In the construction illustrated in Figures 1 to 3, the apparatus is contained in a main casing 16 having a cover 17 bolted thereto as at 18. Within the casing 16 is a positive displacement pump represented as a whole by the reference numeral 19, the rotor of the pump containing vanes which revolve about a shaft 20. The casing of the pump provides an inlet, also indicated by the reference numeral 11 in the section shown in Figure 2, and an outlet 12, these two passages bearing numbers corresponding to the reference numerals employed in Figure 4.

Parallel with the shaft 20 is the valve 14 in the lower part of casing 16 and this valve controls the by-pass passage 15 as already described, the formation of the inlet passage 11 in the casing being such as to afford communication with the by-pass passage 15 as indicated in dotted lines in Figure 2. On the outlet side of the pump the outlet passage in casing 16 is formed also as clearly shown to communicate with the passage 13 leading to the outlet 12.

The pump 19 drives a centrifugal speed responsive device of which the main spindle is represented at 21 and the centrifugal members are shown as comprising bellcrank arms 22, 23 pivoted at 24 in a disc integral with spindle 21. Arms 22 bear on a plate 25 that is mounted by means of a thrust bearing 26 on the end of a plunger 27 which itself at its opposite end is engaged with one arm of a control lever 28 pivoted at 29 centrally of its length in ears extending inwardly from the cover 17. The other end of lever 28 bears against the end of a tubular member 30 which can slide endwise on a fixed or adjustable rod 31 in the same manner as the plunger 27, which also is tubular, and mounted to slide on a fixed or adjustable rod 32. The tubular member 30 is integral with one end of a closed bellows 33, the other end of which is connected at 34 to the by-pass valve 14. A compression spring 35 is located within the bellows and acts on the ends of the latter to provide a spring loading against atmospheric pressure.

In operation, the output pressure of the pump 19 acts on the by-pass valve 14 with a tendency to open this valve. Under normal conditions of operation, the valve will be more or less open passing the excess delivery of the fluid back to the suction side of the pump as can be clearly seen from a study of the diagram, Figure 4. The delivery pressure from the pump is controlled by the force with which the speed responsive device acts upon valve 14 and this pressure will rise with increasing speed of the speed responsive device until a predetermined stop position is reached.

In the case of a decrease in atmospheric pressure acting upon bellows 33, the bellows lengthen under the action of the compression spring 35. This spring reacting through the valve on the delivery pressure moves the centrifugal members of the speed responsive device to a position of shorter effective radius so that the controlling force produced by the said device is decreased and the valve is thus permitted to open under the action of the delivery pressure on the valve and so reduce this pressure. The converse of this will, of course, occur with an increase in atmospheric pressure.

In order to correct the fluid pressure for variations in temperature the bellows may be gas filled.

We claim:

1. A fluid-supply and control system comprising in combination a pump driven by an engine or other fuel-consuming means, which pump delivers fluid at excess flow and has a by-pass between the inlet and outlet, valve means controlling said by-pass, a speed-sensitive device driven in company with the pump, and pressure-responsive means which varies automatically in effective length and constitutes an operative connection between the speed-sensitive device and said valve means to vary the effective length of that operative connection, whereby the force with which the speed-sensitive device acts upon the valve is varied by changes in pressure to which the pressure-responsive means is subjected, said pressure-responsive means including a collapsible device resiliently controlled to provide a loading for the valve.

2. A fluid-supply and control system comprising in combination a pump driven by an engine or other fuel-consuming means, which pump delivers fluid at excess flow and has a by-pass between the inlet and outlet, valve means controlling said by-pass, a speed-sensitive device driven in company with the pump, and pressure-responsive means which varies automatically in effective length and constitutes an operative connection between the speed-sensitive device and said valve means to vary the effective length of that operative connection, whereby the force with which the speed-sensitive device acts upon the valve is varied by changes in pressure to which the pressure-responsive means is subjected, said pressure-responsive means including a collapsible resilient device, the resilience of which provides a loading for the valve.

CYRIL ALPHONSO PUGH.
DOUGLAS GERHARD BOOTH.